United States Patent
Sakurazawa

(10) Patent No.: US 9,836,145 B2
(45) Date of Patent: Dec. 5, 2017

(54) MOBILE TERMINAL APPARATUS AND DISPLAY METHOD THEREFOR

(75) Inventor: Kuniaki Sakurazawa, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/344,539

(22) PCT Filed: Sep. 14, 2012

(86) PCT No.: PCT/JP2012/073619
§ 371 (c)(1),
(2), (4) Date: Mar. 12, 2014

(87) PCT Pub. No.: WO2013/039198
PCT Pub. Date: Mar. 21, 2013

(65) Prior Publication Data
US 2014/0342781 A1     Nov. 20, 2014

(30) Foreign Application Priority Data
Sep. 15, 2011   (JP) .................................. 2011-202109

(51) Int. Cl.
*H04B 1/38*   (2015.01)
*G06F 3/041*   (2006.01)
(Continued)

(52) U.S. Cl.
CPC .............. *G06F 3/041* (2013.01); *G06F 1/169* (2013.01); *G06F 1/1626* (2013.01);
(Continued)

(58) Field of Classification Search
CPC ... G06F 3/0414; G06F 3/0416; G06F 3/03545
(Continued)

(56) References Cited

U.S. PATENT DOCUMENTS

2003/0103038 A1   6/2003   Wong et al.
2005/0184955 A1   8/2005   Wong et al.
(Continued)

FOREIGN PATENT DOCUMENTS

EP   1841189 A1   10/2007
JP   2004-302734 A   10/2004
(Continued)

OTHER PUBLICATIONS

International Search Report corresponding to International Application No. PCT/JP2012/073619, dated Nov. 15, 2012, 1 page.
(Continued)

*Primary Examiner* — Thomas Lett
(74) *Attorney, Agent, or Firm* — Wilmer Cutler Pickering Hale and Dorr LLP

(57) ABSTRACT

A mobile terminal apparatus comprises: a touch pad sensor that is arranged on a back surface of a housing, and detects a contact position when held by a user; and a holding pattern determining unit that determines a holding pattern having a highest similarity to a touch pad detection data detected by the touch pad sensor among a plurality of predetermined holding patterns to output the determined holding pattern. The mobile terminal apparatus controls an orientation of information displayed on a display screen of a display unit based on the holding pattern outputted by the holding pattern determining unit.

11 Claims, 13 Drawing Sheets

(51) Int. Cl.
  *G06F 1/16* (2006.01)
  *H04M 1/725* (2006.01)
  *H04M 1/02* (2006.01)
  *H04N 21/414* (2011.01)
  *H04N 21/422* (2011.01)
  *H04N 21/442* (2011.01)

(52) U.S. Cl.
  CPC ........ *G06F 1/1694* (2013.01); *H04M 1/0266* (2013.01); *H04M 1/72569* (2013.01); *G06F 2200/1614* (2013.01); *G06F 2200/1637* (2013.01); *G06F 2203/04104* (2013.01); *H04M 2250/22* (2013.01); *H04N 21/41407* (2013.01); *H04N 21/42202* (2013.01); *H04N 21/44218* (2013.01)

(58) Field of Classification Search
  USPC .......................... 455/566; 345/158, 173, 659
  See application file for complete search history.

(56) References Cited

U.S. PATENT DOCUMENTS

| | | | |
|---|---|---|---|
| 2006/0097991 A1* | 5/2006 | Hotelling | G06F 3/0416 345/173 |
| 2006/0197750 A1* | 9/2006 | Kerr | G06F 1/1626 345/173 |
| 2007/0002016 A1* | 1/2007 | Cho et al. | 345/157 |
| 2007/0296693 A1 | 12/2007 | Wong et al. | |
| 2010/0085317 A1* | 4/2010 | Park et al. | 345/173 |
| 2010/0134423 A1* | 6/2010 | Brisebois | G06F 3/03547 345/173 |
| 2010/0171699 A1 | 7/2010 | Wong et al. | |
| 2012/0127069 A1* | 5/2012 | Santhiveeran et al. | 345/156 |
| 2012/0146901 A1* | 6/2012 | Ujiie | G06F 3/0346 345/157 |
| 2013/0300668 A1* | 11/2013 | Churikov | G06F 3/041 345/168 |

FOREIGN PATENT DOCUMENTS

| | | |
|---|---|---|
| JP | 2007017596 A | 1/2007 |
| JP | 2007-141029 A | 6/2007 |
| JP | 2008532185 A | 8/2008 |
| JP | 2009077221 A | 4/2009 |
| JP | 2011-118466 A | 6/2011 |
| WO | WO-200696501 A1 | 9/2006 |

OTHER PUBLICATIONS

Japanese Office Action issued by the Japan Patent Office for Application No. 2011-202109 dated Jun. 2, 2015 (6 pages).

Japanese Office Action issued by the Japan Patent Office for Application No. 2011-202109 dated Aug. 25, 2015 (6 pages).

Extended European Search Report issued by the European Patent Office for Application No. 12832392.0 dated Mar. 19, 2015 (8 pages).

Japanese Office Action issued in corresponding to Japanese Patent Application No. 2016-044257, dated Jan. 10, 2017, 6 pages.

* cited by examiner

FIG. 4
CELLS OF TOUCH PAD SENSOR (BACK SURFACE OF HOUSING) 105

| (1,1) | (1,2) | · | · | · | · | · | (1,m−1) | (1,m) |
|---|---|---|---|---|---|---|---|---|
| (2,1) | (2,2) | · | · | · | · | · | (2,m−1) | (2,m) |
| · | · | · | · | · | · | · | · | · |
| · | · | · | · | · | · | · | · | · |
| · | · | · | · | · | · | · | · | · |
| · | · | · | · | · | · | · | · | · |
| · | · | · | · | · | · | · | · | · |
| · | · | · | · | · | · | · | · | · |
| · | · | · | · | · | · | · | · | · |
| · | · | · | · | · | · | · | · | · |
| · | · | · | · | · | · | · | · | · |
| · | · | · | · | · | · | · | · | · |
| (n−1,1) | (n−1,2) | · | · | · | · | · | (n−1,m−1) | (n−1,m) |
| (n,1) | (n,2) | · | · | · | · | · | (n,m−1) | (n,m) |

TRANSPARENT VIEW OF TOUCH PAD SENSOR FROM DISPLAY SCREEN (A) DISPLAY PATTERN A
(FUNDAMENTAL DISPLAY ORIENTATION)

(B) DISPLAY PATTERN B (C) DISPLAY PATTERN C (D) DISPLAY PATTERN D

FIG. 6

(A) REGISTERED PATTERN A FOR DISPLAY PATTERN A — 601

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 1 |
| 1 | 1 | 1 | 0 | 0 | 0 | 0 | 0 | 1 |
| 1 | 1 | 1 | 0 | 0 | 0 | 0 | 1 | 1 |
| 1 | 1 | 1 | 0 | 0 | 0 | 0 | 1 | 1 |
| 1 | 1 | 1 | 0 | 0 | 0 | 0 | 1 | 1 |
| 1 | 1 | 1 | 0 | 0 | 0 | 0 | 0 | 1 |
| 1 | 1 | 1 | 0 | 0 | 0 | 0 | 0 | 1 |
| 1 | 1 | 0 | 0 | 0 | 0 | 0 | 0 | 0 |
| 1 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

(B) REGISTERED PATTERN B FOR DISPLAY PATTERN B — 602

| 0 | 1 | 1 | 1 | 1 | 1 | 1 | 0 | 0 |
|---|---|---|---|---|---|---|---|---|
| 0 | 1 | 1 | 1 | 1 | 1 | 1 | 0 | 0 |
| 0 | 0 | 1 | 1 | 1 | 1 | 0 | 0 | 0 |
| 0 | 0 | 0 | 1 | 1 | 1 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 1 | 1 | 1 | 1 |
| 0 | 0 | 0 | 0 | 0 | 1 | 1 | 1 | 1 |

(C) REGISTERED PATTERN C FOR DISPLAY PATTERN C — 603

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 1 | 0 | 0 |
| 0 | 0 | 0 | 0 | 0 | 0 | 1 | 1 | 0 |
| 1 | 0 | 0 | 0 | 0 | 0 | 1 | 1 | 1 |
| 1 | 0 | 0 | 0 | 0 | 0 | 1 | 1 | 1 |
| 1 | 1 | 0 | 0 | 0 | 0 | 1 | 1 | 1 |
| 1 | 1 | 0 | 0 | 0 | 0 | 1 | 1 | 1 |
| 1 | 1 | 0 | 0 | 0 | 0 | 1 | 1 | 1 |
| 1 | 0 | 0 | 0 | 0 | 0 | 1 | 1 | 1 |
| 1 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

(D) REGISTERED PATTERN D FOR DISPLAY PATTERN D — 604

| 1 | 1 | 1 | 1 | 0 | 0 | 0 | 0 | 0 |
|---|---|---|---|---|---|---|---|---|
| 1 | 1 | 1 | 1 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 1 | 1 | 1 | 0 | 0 | 0 |
| 0 | 0 | 0 | 1 | 1 | 1 | 1 | 0 | 0 |
| 0 | 0 | 1 | 1 | 1 | 1 | 1 | 1 | 0 |
| 0 | 0 | 1 | 1 | 1 | 1 | 1 | 1 | 0 |

FIG. 7

TOUCH PAD SENSOR DETECTION DATA

| | | | | | | 801 | | |
|---|---|---|---|---|---|---|---|---|
| 0 | 1 | 1 | 1 | 1 | 1 | 1 | 1 | 0 |
| 0 | 1 | 1 | 1 | 1 | 1 | 1 | 1 | 0 |
| 0 | 1 | 1 | 1 | 1 | 1 | 1 | 1 | 0 |
| 0 | 0 | 1 | 1 | 1 | 1 | 1 | 1 | 0 |
| 0 | 0 | 0 | 0 | 0 | 0 | 1 | 1 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 1 | 1 | 1 | 1 | 1 |
| 0 | 0 | 0 | 0 | 1 | 1 | 1 | 1 | 1 |
| 0 | 0 | 0 | 0 | 1 | 1 | 1 | 1 | 1 |
| 0 | 0 | 0 | 0 | 1 | 1 | 1 | 1 | 1 |
| 0 | 0 | 0 | 0 | 1 | 1 | 1 | 1 | 1 |
| 0 | 0 | 0 | 0 | 1 | 1 | 1 | 1 | 1 |

(6 points to upper-left corner)

FIG. 8

(A) NUMBER OF CELLS MATCHED WITH HOLDING PATTERN A 58

(B) NUMBER OF CELLS MATCHED WITH HOLDING PATTERN B 112

(C) NUMBER OF CELLS MATCHED WITH HOLDING PATTERN C 72

(D) NUMBER OF CELLS MATCHED WITH HOLDING PATTERN D 96

MOBILE TERMINAL APPARATUS AND DISPLAY METHOD THEREFOR

TECHNICAL FIELD

Cross-Reference to Related Application

This application is a national stage application of International Application No. PCT/JP2012/073619, entitled "Mobile Terminal Apparatus and Display Method Therefor," filed on Sep. 14, 2012, which claims the benefit of the priority of Japanese Patent Application No. 2011-202109, filed on Sep. 15, 2011, the disclosures of which are hereby incorporated by reference herein in their entirety.

This invention relates to a mobile terminal apparatus and a display method therefor. Particularly, this invention relates to a technology in which an orientation of information displayed on a display screen of a mobile terminal apparatus can be switched automatically.

BACKGROUND

When a user uses a mobile terminal apparatus, an orientation of the mobile terminal apparatus held by the user is not always the same. Hence, it is desired that an orientation displayed on a display screen is rotated in accordance with the orientation held by the user.

As a method for detecting an orientation held by a user, it has been proposed as follows. By arranging noncontact sensors using infrared rays on four side surfaces of a mobile terminal apparatus, it is detected which side surface of the mobile terminal apparatus the user is facing to, that is, an orientation of the display screen viewed by the user.

However, in case where detecting a position of a user using an infrared sensor as the above-mentioned method, the occurrence possibility of a detection error tends to be high. For instance, when an object other than the user is present near the mobile terminal apparatus, there is possibility to erroneously detect the object as the user.

In Patent Literature (PLT) 1, as a method for solving the above problem, there is disclosed a display method in which information is displayed on a display screen in a desired orientation for a user by acquiring face information of the user using a digital camera function included in a mobile terminal apparatus and obtaining a relative positional relation between an orientation of the face and that of the mobile terminal apparatus.

CITATION LIST

[PTL 1]
Japanese Patent Kokai Publication No. JP2007-17596A

SUMMARY

The disclosure of the above cited Patent Literature is incorporated herein in its entirety by reference thereto. The analysis below will be presented according to the view point of the present invention.

In the method described in Patent Literature 1, it is necessary to recognize an orientation of a face from a captured image. However, there is a problem in which the recognition does not operate normally due to deterioration in detection accuracy of the orientation of the face under an environment of a low luminance. Besides, there is another problem in which a face of a user may go out of an imaging visual field, depending on the user's posture for holding the mobile terminal apparatus. Under these circumstances, it is impossible to apply the method described in Patent Literature 1.

It is an object of the present invention to provide a mobile terminal apparatus such that: it is possible to stably determine an orientation held by a user without depending on the operating environment of the mobile terminal apparatus and the user's posture for holding the mobile terminal apparatus, and to rotate an orientation displayed on a display screen of the mobile terminal apparatus.

According to a first aspect of the present invention, there is provided a mobile terminal apparatus, comprising: a touch pad sensor that is arranged on a back surface of a housing, and detects a contact position when held by a user; and a holding pattern determining unit that determines a holding pattern having a highest similarity to touch pad sensor detection data detected by the touch pad sensor among a plurality of predetermined holding patterns to output the determined holding pattern. The mobile terminal apparatus controls an orientation of information displayed on a display screen of a display unit based on the holding pattern outputted by the holding pattern determining unit.

According to a second aspect of the present invention, there is provided a display method for a mobile terminal apparatus that controls an orientation of information displayed on a display screen thereof. The display method for a mobile terminal apparatus comprises: acquiring touch pad sensor detection data when a user holds the mobile terminal apparatus by a touch pad sensor arranged in the mobile terminal apparatus; determining a holding pattern having a highest similarity to the touch pad sensor detection data among a plurality of predetermined holding patterns, and outputting the determined holding pattern; and switching an orientation of information displayed on a display screen of the mobile terminal apparatus based on the holding pattern outputted by the determining step.

According to the first aspect of the present invention, it is possible to provide a mobile terminal apparatus in which it is possible to stably determine an orientation held by a user without depending the operating environment of the mobile terminal apparatus and the user's posture for holding the mobile terminal apparatus, and rotate an orientation of information displayed on a display screen of the mobile terminal apparatus in accordance with the orientation held by the user.

According to the second aspect of the present invention, it is possible to provide a display method for a mobile terminal apparatus in which it is possible to stably determine an orientation held by a user without depending the operating environment of the mobile terminal apparatus and the user's posture for holding the mobile terminal apparatus, and to rotate an orientation of information displayed on a display screen of the mobile terminal apparatus in accordance with the orientation held by the user.

BRIEF DESCRIPTION OF THE DRAWINGS

FIG. 4 is a diagram illustrating a touch pad sensor in the mobile terminal apparatus in accordance with the first exemplary embodiment of the present disclosure;

FIG. 6 is a diagram illustrating one example of registered patterns in a holding pattern registration for the mobile terminal apparatus in accordance with the first exemplary embodiment of the present disclosure;

FIG. 7 is a diagram illustrating one example of touch pad sensor detection data in the mobile terminal apparatus in accordance with the first exemplary embodiment of the present disclosure;

FIG. 8 is a diagram illustrating one example of matching determination data in the mobile terminal apparatus in accordance with the first exemplary embodiment of the present disclosure;

PREFERRED MODES

Figure 1:
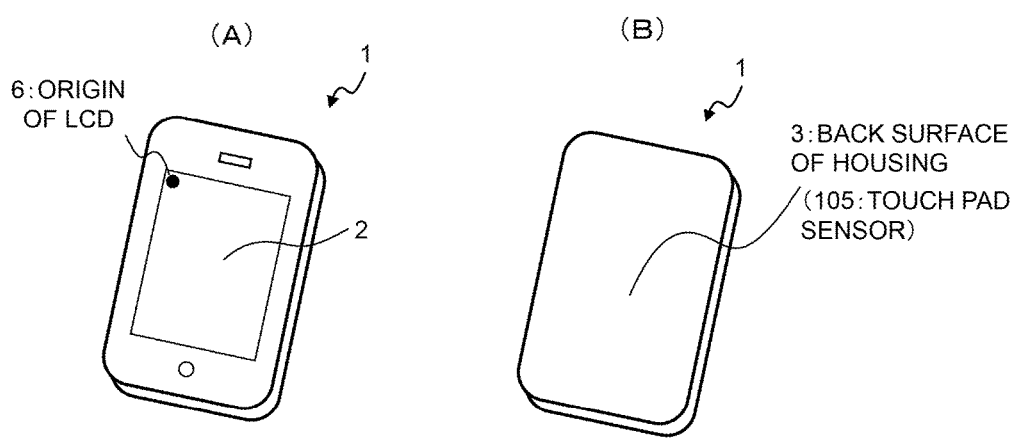
FIG. 1 is a perspective diagram illustrating a mobile terminal apparatus in accordance with a first exemplary embodiment of the present disclosure.

An outline of preferred modes of the present disclosure will be described with reference to the drawings if necessary. It is noted that drawing reference symbols referred in the following outline are shown only as examples to assist understanding, and are not intended to limit the present disclosure to the illustrated modes.

According to one exemplary embodiment of the present disclosure, as illustrated in any one of FIGS. 1-3, 6-7, a mobile terminal apparatus comprises: a touch pad sensor (105 in FIGS. 1, 2) that is arranged on a back surface of a housing (3 in FIG. 1), and detects a contact position when held by a user; and a holding pattern determining unit (202 in FIG. 3) that determines a holding pattern having a highest similarity to touch pad sensor detection data (801 in FIG. 7) detected by the touch pad sensor among a plurality of predetermined holding patterns (601 to 604 in FIG. 6) to output the determined holding pattern. An orientation of information displayed on a display screen (2 in FIG. 1) of a display unit (104 in FIG. 2) is controlled based on the holding pattern outputted by the holding pattern determining unit.

According to one exemplary embodiment of the present disclosure, as illustrated in any one of FIGS. 1-2, 6-7, 10-11, a display method for a mobile terminal apparatus (1 in FIG. 1) that controls an orientation of information displayed on a display screen (2 in FIG. 1) thereof is provided. The display method comprises: acquiring (S900 in FIG. 11 or the like) touch pad sensor detection data (801 in FIG. 7) when a user holds the mobile terminal apparatus by a touch pad sensor (105 in FIGS. 1, 2) arranged in the mobile terminal apparatus; determining (S701, S702 in FIG. 10) a holding pattern having a highest similarity to the touch pad sensor detection data (801 in FIG. 7) among a plurality of predetermined holding patterns (601 to 604 in FIG. 6), and outputting the determined holding pattern; and switching (S904 in FIG. 11) an orientation of information displayed on a display screen (2 in FIG. 1) of the mobile terminal apparatus (1 in FIG. 1) based on the holding pattern outputted by the determining step.

In the present disclosure, there are various possible modes, which include the following.

(Mode 1)

As described in the first aspect of the present invention.

(Mode 2)

The mobile terminal apparatus may further comprise a holding pattern registering unit that acquires outputs of the touch pad sensor when held in a plurality of predetermined holding states, and registers the outputs as the plurality of predetermined holding patterns, respectively.

(Mode 3)

The holding pattern determining unit may calculate the number of elements matching between the touch pad sensor detection data and each of the plurality of predetermined holding patterns, and may determine that a predetermined holding pattern whose number of elements is maximum among the plurality of predetermined holding patterns has the highest similarity.

(Mode 4)

In the mobile terminal apparatus, the touch pad sensor may be arranged also on a side surface of the housing, and the holding pattern determining unit may output a holding pattern having a highest similarity among the plurality of predetermined holding patterns based on touch pad sensor detection data detected by the touch pad sensor arranged on the back surface and the side surface of the housing.

(Mode 5)

The plurality of predetermined holding patterns preferably include at least two holding patterns having holding orientations orthogonal to each other.

(Mode 6)

The plurality of predetermined holding patterns preferably include at least four holding patterns having holding orientations orthogonal or parallel to each other.

(Mode 7)

As described in the second aspect of the present invention.

(Mode 8)

The display method for a mobile terminal apparatus may further comprise acquiring outputs of the touch pad sensor when held in a plurality of predetermined holding states, and register in advance the outputs as the plurality of predetermined holding patterns, respectively.

The exemplary embodiments will now be described below.

First Exemplary Embodiment

Constitution of the First Exemplary Embodiment

FIG. 1 is a perspective diagram illustrating a mobile terminal apparatus 1 in accordance with a first exemplary embodiment of the present disclosure. FIG. 1A is a perspective diagram illustrating a mobile terminal apparatus 1 viewed from a display screen 2 side; whereas FIG. 1B is a perspective diagram illustrating a mobile terminal apparatus 1 viewed from a back surface of a housing 3 opposite to the display screen 2. A touch pad sensor 105 is arranged on almost the entire back surface of housing 3 of the mobile terminal apparatus 1. For instance, the touch pad sensor is a well-known device using a similar principle to a pointing device used in a notebook computer, and has a function of determining as to whether or not a human finger is contact with the touch pad sensor. The display screen 2 of a display unit (104 in FIG. 2) is formed by a LCD (Liquid Crystal Display). Here, a position of an origin of LCD 6 is defined as illustrated in FIG. 1.

As illustrated in FIG. 4, the touch pad sensor 105 includes n-by-m cells (elements) arranged two-dimensionally. FIG. 4 is a transparent view of the touch pad sensor viewed from the display screen 2 side. As illustrated in FIG. 4, cell numbers (1, 1) to (n, m) are placed. A position of the cell number (1, 1) in FIG. 4 corresponds to a position of the origin of LCD 6.

When a user holds the mobile terminal apparatus 1, the touch pad sensor 105 outputs "1"s for cells contact with the user, "0"s for cells not contact with the user. FIG. 7 is one example of touch pad detection data 801 outputted by the touch pad sensor 105. Cells of "1" represent cells that are contact with a finger of a user, whereas cells of "0" represent cells that are not contact with a finger of a user.

Figure 2:
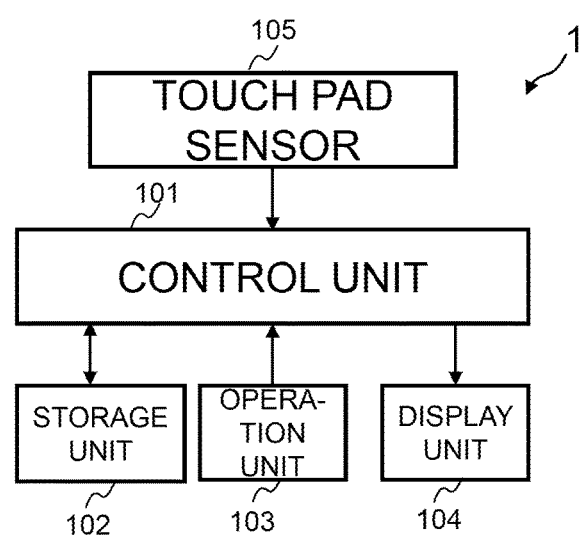
FIG. 2 is a block diagram illustrating an overview of the mobile terminal apparatus in accordance with the first exemplary embodiment of the present disclosure.

Next, FIG. 2 is a block diagram illustrating an overview of the mobile terminal apparatus 1. The mobile terminal apparatus 1 comprises an operation unit 103 that processes various inputs from a user, a display unit 104 that displays information such as an image, characters on the display screen 2, a storage unit 102 that stores various data and programs, the above-mentioned touch pad sensor 105, and a control unit 101 that controls the entire mobile terminal apparatus 1.

Figure 3:
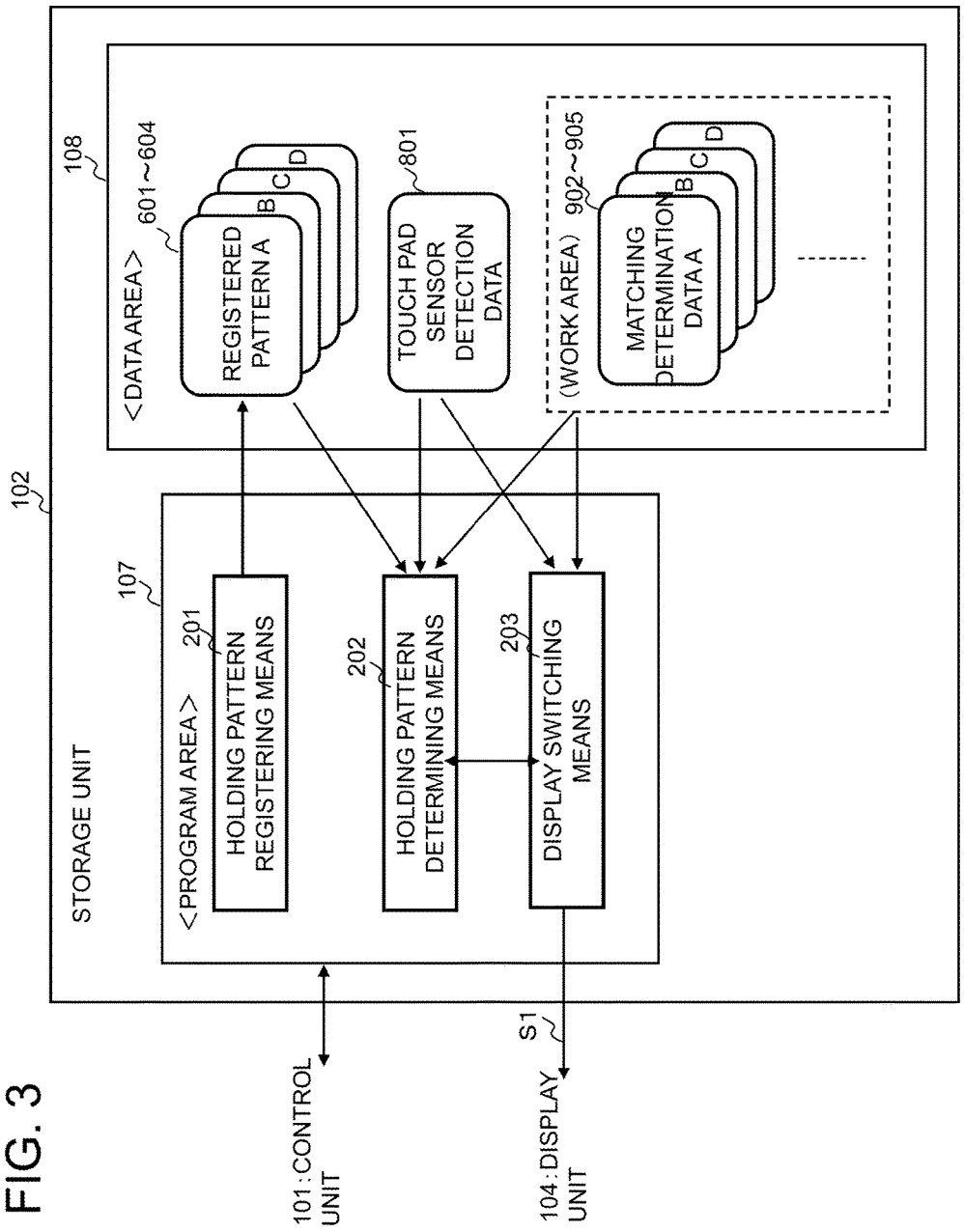
FIG. 3 is a diagram illustrating respective functions of the mobile terminal apparatus in accordance with the first exemplary embodiment of the present disclosure.

Next, FIG. 3 is a diagram illustrating respective functions of the mobile terminal apparatus 1 in accordance with the first exemplary embodiment. As illustrated in FIG. 3, the mobile terminal apparatus 1 comprises the following units in a program area 107 of the storage unit 102: a holding pattern registering unit 201 having a holding pattern registering function, a holding pattern determining unit 202 having a holding pattern determining function, and a display switching unit 203 having a display switching function. The above units are configured by a program, respectively; the program is fetched and processed by a CPU (not shown) included in the control unit 101. FIG. 3 illustrates one example in which the respective functions are configured by a program, but is not limited to the configuration. For instance, all or part of the respective functions may be configured to be embedded into a hardware such as a special purpose LSI. It is noted that the details of respective functions will be described later.

In FIG. 3, a data area 108 stores data needed in the respective functions. Specifically, touch pad detection data 801 acquired by the touch pad sensor 105, and registered patterns A to D (601 to 604) registered by a holding pattern registering unit 201 are stored in the data area 108. Other data used in the holding pattern determining unit 202 and the display switching unit 203, for instance, matching determination data A to D (902 to 905) are stored in a work area.

The display switching unit 203 in FIG. 3 outputs a display switching control signal S1 to the display unit 104; the display unit 104 rotates an orientation of information displayed on the display screen 2 based on the display switching control signal S1.

Operation of the First Exemplary Embodiment

Figure 5:
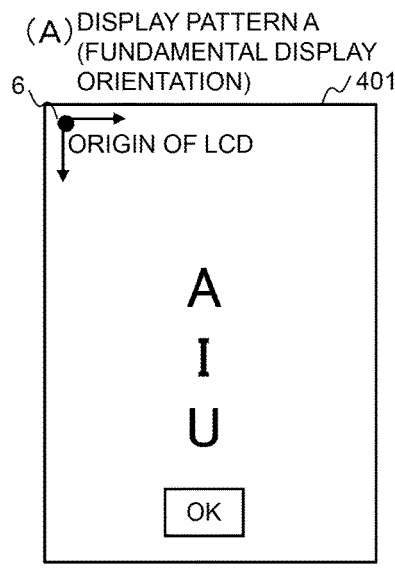
FIG. 5 is a diagram illustrating holding pattern registration of the mobile terminal apparatus in accordance with the first exemplary embodiment of the present disclosure.
Figure 5:
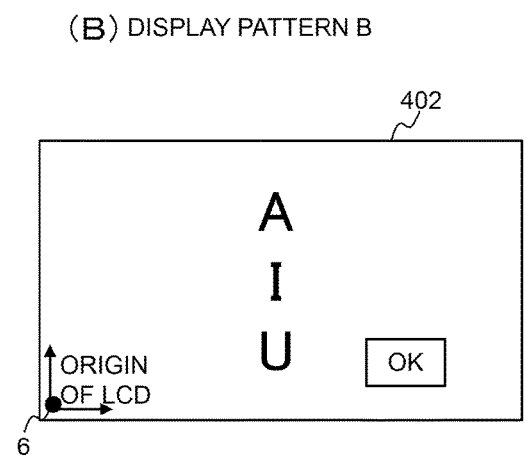
Figure 5:
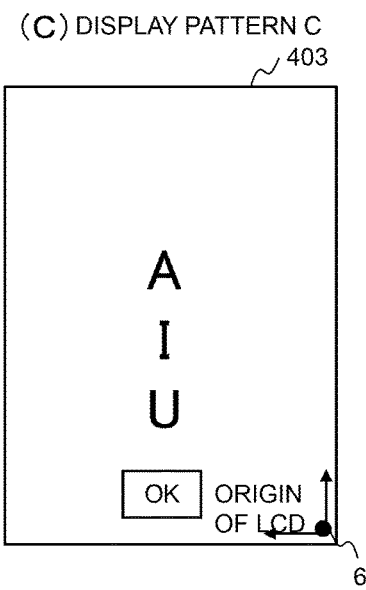
Figure 5:
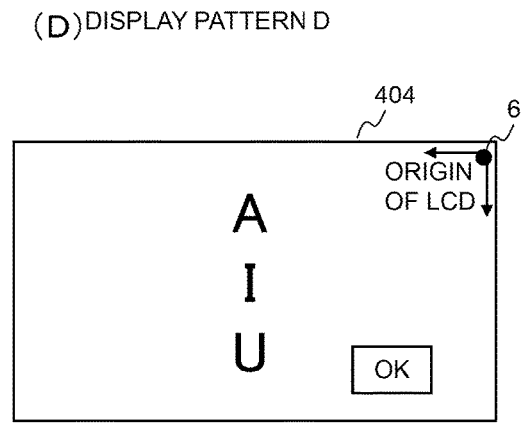

Next, an operation of the mobile terminal apparatus 1 in accordance with the first exemplary embodiment will be described. First, an operation of the holding pattern registering unit 201 initially performed by a user will be described with reference to FIG. 5 and FIG. 9. As illustrated in FIG. 5, it is assumed that there are four predetermined holding states A to D in the mobile terminal apparatus 1. As illustrated in FIG. 5A, the holding state A is a holding state in which the origin of LCD 6 is located at the upper left when viewed from the user. The holding state A may have the highest use frequency, thus, it is also referred to as a fundamental holding state. As illustrated in FIG. 5B, the holding state B is a holding state in which the origin of LCD 6 is located at the lower left when viewed from the user. As illustrated in FIG. 5C, the holding state C is a holding state in which the origin of LCD 6 is located at the lower right when viewed from the user. As illustrated in FIG. 5D, the holding state D is a holding state in which the origin of LCD 6 is located at the upper right when viewed from the user.

The holding pattern registering unit 201 has a function of giving a user an instruction to hold the mobile terminal apparatus 1 with four predetermined holding states, and registering in advance the outputs of the touch pad sensor corresponding to the four states as predetermined holding patterns A to D, respectively. The registered four predetermined holding patterns A to D are also referred to as registered patterns A to D.

When the user selects "holding pattern registration" in an operation menu using the operation unit 103, the mobile terminal apparatus 1 transits to a holding pattern registration mode, and after that, an operation of holding pattern registration is started.

Figure 9:
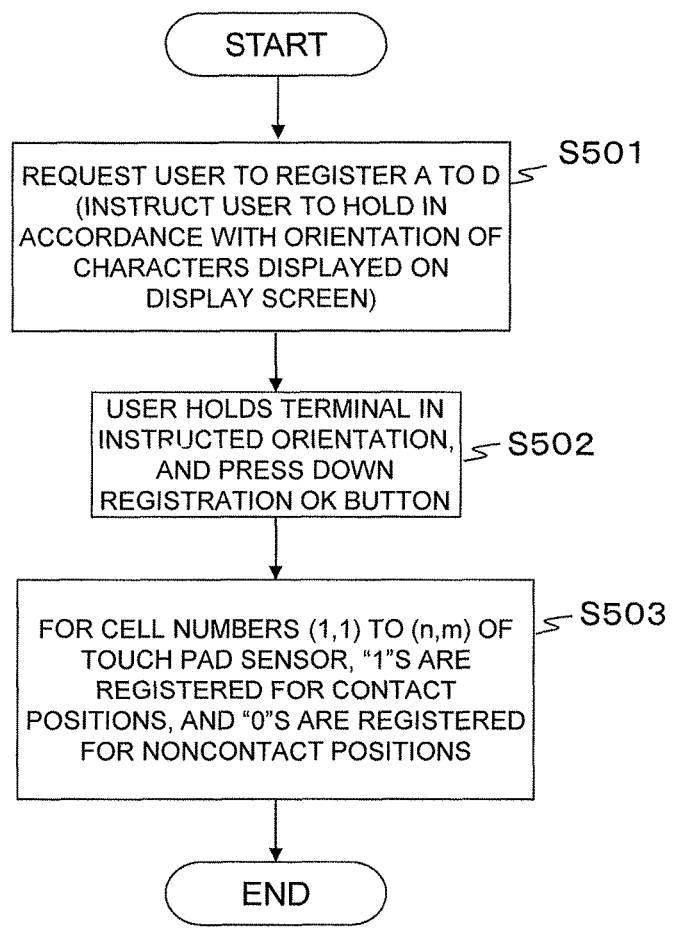
FIG. 9 is a flow chart illustrating operations of holding pattern registering unit in the mobile terminal apparatus in accordance with the first exemplary embodiment of the present disclosure.

FIG. 9 is a flow chart illustrating an operation of holding pattern registration. In FIG. 9, first, a registration of the registered pattern A is requested to the user (step S501). Specifically, as illustrated in FIG. 5A, a display pattern A (401) is displayed on the display screen 2. An instruction to hold the mobile terminal apparatus 1 so that an orientation of displayed characters "AIU" is valid is given to the user. According to the instruction, the user holds the mobile terminal 1 so that characters "AIU" are displayed in a right orientation. In this situation, the user is holding the mobile terminal apparatus 1 in the holding state A. Next, the user pushes down "OK" on the display screen 2 (step S502). By doing this, data having "1"s for contact positions, "0"s for non-contact positions among the cell numbers (1, 1) to (n, m) of the touch pad sensor 105 is registered as a registered pattern A (601).

Similarly, by repeating the steps S501 to S503 for display patterns B to D (402 to 404) in FIGS. 5B to 5D, respectively, registered patterns B to D (602 to 604) are registered. By the above operations, the registered patterns A to D are registered in the data area 108 of the storage unit 102 in FIG. 3. The registered patterns A to D obtained by the above operations are illustrated in FIGS. 6A to 6D, respectively. FIG. 6 illustrates as a position of the origin of LCD 6 corresponding to each of the registered patterns is located at the upper left, that is, the cell (1, 1) of the touch pad sensor is located at the upper left. The registered patterns A to D of FIG. 6 reflect the user's habits on how to hold in the holding states A to D.

It is noted that in the first exemplary embodiment, the registered patterns A to D are generated by the holding pattern registration, however, it is possible to constitute so as to use fixed patterns for predetermined holding patterns A to D without performing holding pattern registration. In this case, averages of holding patterns by many users may be used. However, in the case where registered patterns A to D registered by letting the user actually hold the mobile terminal apparatus 1 are used as in the first exemplary embodiment, it is possible to acquire data reflecting the user's habit on how to hold, which makes it possible to obtain an effect of improving accuracy in holding pattern determination (described later). Besides, in the case where the mobile terminal apparatus 1 is used by a plurality of users, it may be configured so as to perform the holding pattern registration for the respective users. In this case, by using a user authentication technique, registered patterns A to D corresponding to a user using the mobile terminal apparatus 1 can be selected automatically.

Next, a holding pattern determining function and a display switching function in a normal operation after the above-mentioned holding pattern registration will be described with reference to FIGS. 10, 11. FIG. 11 is a flow chart illustrating an operation of display switching performed by the display switching unit 203 (FIG. 3). Step S902 in FIG. 11 is a holding pattern determination performed by the holding pattern determining unit 202 (FIG. 3). The detail of step S902 is illustrated in a flow chart of FIG. 10. Namely, a program of a holding pattern determining unit 202 is called as a function in a program of display switching unit 203.

First, in FIG. 11, the touch pad sensor 105 acquires touch pad sensor detection data 801 (step S900). FIG. 7 illustrates one example of the touch pad sensor detection data 801. "1"s for contact positions, "0"s for non-contact positions are illustrated in FIG. 7. As illustrated in FIG. 3, the touch pad sensor detection data 801 is stored in the data area 108 of the storage unit 102.

Next, in FIG. 11, sum of the contact cells (elements) among the touch pad sensor detection data 801 is calculated, and it is determined whether or not the sum is a holding determination threshold value or more (step S901). The holding determination threshold value is a threshold value used for determining whether or not the user is holding the mobile terminal apparatus 1. When the step S901 determines "NO", that is, it is determined that the mobile terminal apparatus 1 is not held, it is supposed to return to the step S900 and repeat the above-mentioned processing. On the other hand, when the touch pad sensor detection data 801 illustrated in FIG. 7 is outputted, the sum is the holding determination threshold value or more. Thus, the step S901 determines "YES", thereby going to a next step S902. As described above, it is possible to perform a holding pattern determination that requires high load arithmetic processing only when the user is holding the mobile terminal apparatus 1. Thus, an effect is brought about that power consumption can be reduced during a period in which the user does not hold the mobile terminal apparatus 1.

Figure 10:
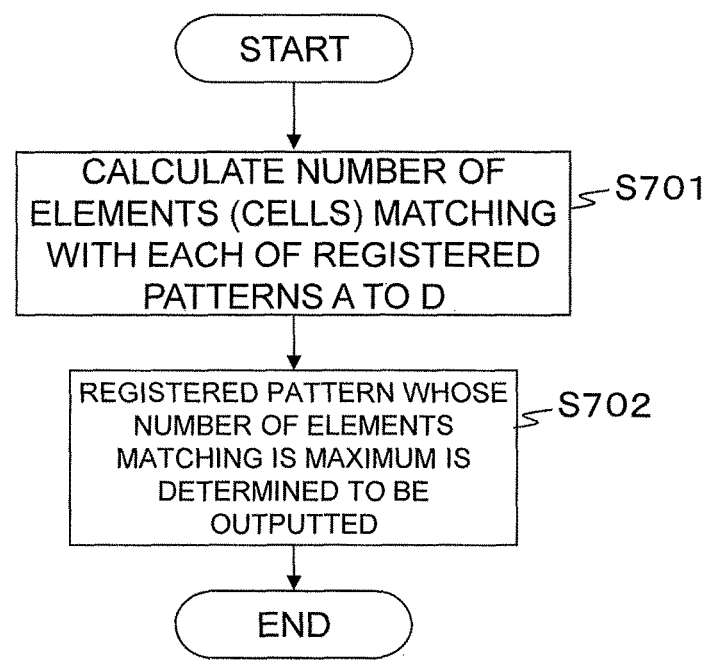
FIG. 10 is a flow chart illustrating operations of holding pattern determining unit in the mobile terminal apparatus in accordance with the first exemplary embodiment of the present disclosure.
Figure 11:
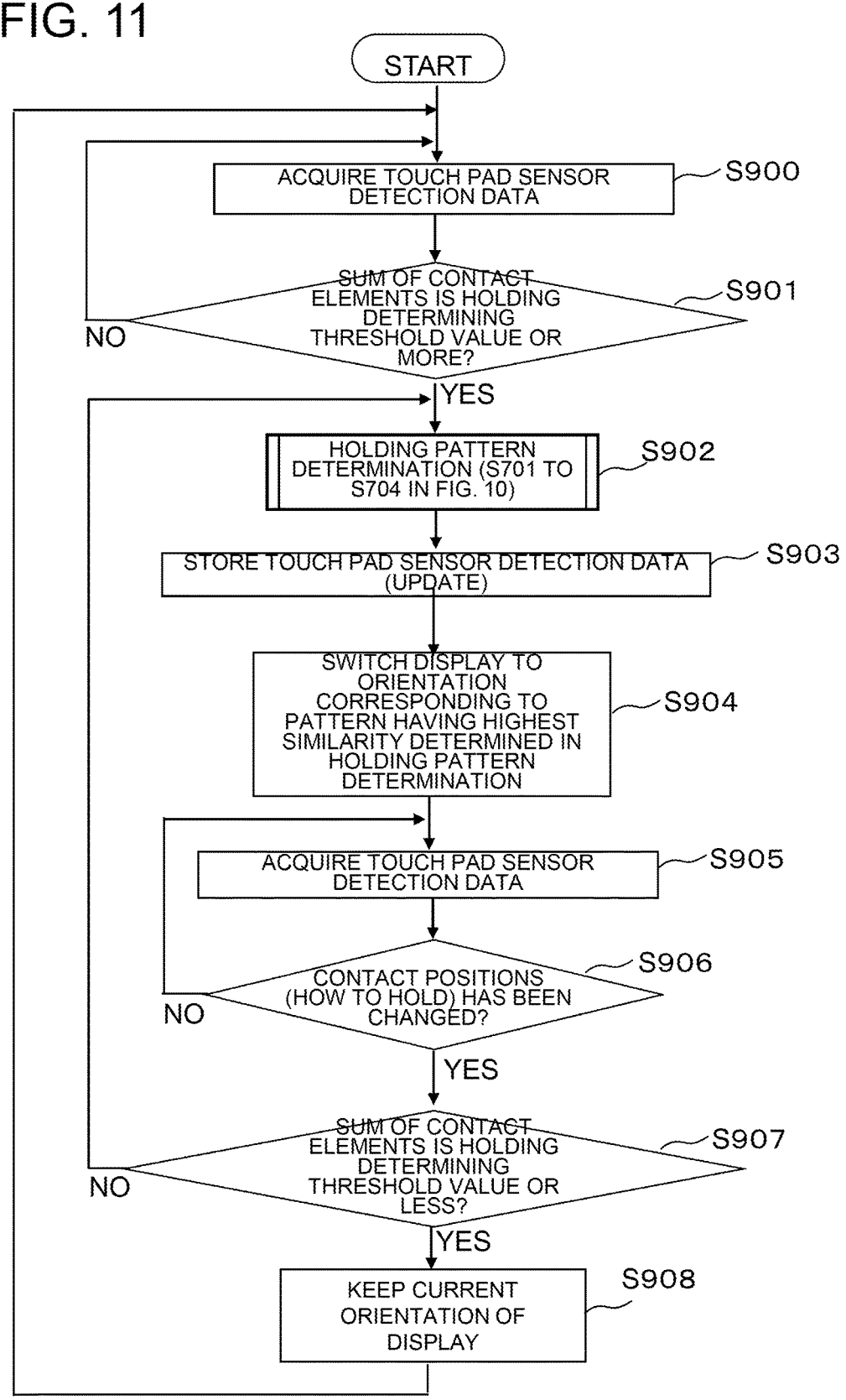
FIG. 11 is a flow chart illustrating operations of display switching unit in the mobile terminal apparatus in accordance with the first exemplary embodiment of the present disclosure.

Next, in the step S902, a function of holding pattern determination illustrated in FIG. 10 is called as described above. In FIG. 10, the number of cells (elements) matching between the touch pad detection data 801 and each of the registered patterns A to D, is calculated (step S701 in FIG. 10). A registered pattern whose number of cells matching is maximum is recognized as a registered pattern that has the highest similarity with the tough pad sensor detection data 801, and the registered pattern is determined to be outputted (step S702). Specifically, by determining whether there is a match or a mismatch between the touch pad detection data 801 in FIG. 7 and each of the registered patterns A to D in FIG. 6, matching determination data A to D (902 to 905) are generated (FIG. 8A to 8D). Here, means a matched cell, and "x" means a mismatched cell. The numbers of matched cells are as follows: 58 for the holding pattern A, 112 for the holding pattern B, 72 for the holding pattern C, and 96 for the holding pattern D. The maximum number of matched cells is obtained by the holding pattern B. Hence, the holding pattern determining unit 202 determines and outputs the holding pattern B. Namely, the above determination means that it is determined that the user is holding the mobile terminal apparatus 1 in the holding state B (state of FIG. 5B).

As an algorithm of the holding pattern determining unit 202, a well-known pattern recognition algorithm other than the method illustrated in FIG. 10 may be applied.

Next, returning to the explanation of the program of the display switching unit 203, in FIG. 11, the touch pad sensor detection data 801 is stored as updated touch pad sensor detection data (step 903). Here, the updated touch pad sensor detection data is stored in the work area of the storage unit 102 (not shown).

Next, an orientation displayed on the display screen 2 of the display unit 104 is switched to an orientation corresponding to the holding pattern that has been determined in the holding pattern determination (step S902). Specifically, the display switching unit 203 outputs a display switching control signal S1 corresponding to the holding pattern (A to D). For instance, when the determination result is the holding pattern A, S1 is set as "00"; when the determination result is the holding pattern B, S1 is set as "01"; when the determination result is the holding pattern C, S1 is set as "10"; when the determination result is the holding pattern D, S1 is set as "11". According to the above-mentioned settings, the display switching control signal S1 can be constituted by two bits. The display unit 104 rotates the display data appropriately based on the display switching control signal S1 when it is necessary to switch the display, and the display unit 104 displays the rotated display data.

Next, the touch pad sensor 105 acquires touch pad sensor detection data 801 (S905). The step S905 is the same as the step S900. Next, by comparing the touch pad sensor detection data 801 and the updated touch pad sensor detection data (stored in S903), it is determined whether or not contact positions have been changed (S906). In this step, it is determined whether or not a holding state by the user has been changed. When any one of the cells has been changed, the step S906 determines YES. When the step S906 determines NO, it is supposed to return to the step S905 and repeat the determination until the holding state by the user is changed. Next, when the step S906 determines YES, it is determined whether or not the sum of contact elements (cells) among the touch pad sensor detection data 801 acquired in the step S905 is the holding determination threshold value or less (step S907). When the step S907 determines NO, it is recognized that the user still holds the mobile terminal apparatus and the holding state has been changed, thereby returning to the step S902 and performing the holding pattern determination S902. As described above, it is possible that only when the user is holding the mobile terminal apparatus and the holding state has been changed, the holding pattern determination (step S902) that requires high load arithmetic processing is performed. Thus, during a period in which there is no change in the user's holding state, an effect of reducing power consumption can be obtained.

On the other hand, when the step S907 determines YES, it is recognized that the user has stopped holding the mobile terminal apparatus 1, as a result of which the current orientation of display will be continued (step S908). Then, it is supposed to return to the first step S900.

Thus far, there has been described the operations of the holding pattern determining unit 202 and the display switching unit 203 illustrated in flow charts of FIGS. 10, 11. For instance, when the touch pad sensor detection data 801 is data illustrated in FIG. 7, as described above, the holding pattern determining unit 202 determines that the touch pad sensor detection data 801 corresponds to the holding pattern B. Then, the display data is displayed in an orientation corresponding to the holding pattern B by rotating an orientation of information displayed on the display screen 2 using the display switching unit 203. Specifically, the information is displayed in an orientation illustrated in FIG. 5B, which makes it possible to realize the control of the orientation of the display screen based on the user's holding state.

As described above, according to the mobile terminal apparatus in accordance with the first exemplary embodiment, a touch pad sensor is arranged on the back surface of the housing, and a holding pattern having a highest similarity to the touch pad sensor detection data among four predetermined holding states is determined to be outputted. Then, an orientation displayed on a display screen of a display unit is controlled based on the holding pattern. Hence, it is possible to stably determine an orientation held by a user without depending on the operating environment of the mobile terminal apparatus and the user's posture for holding the mobile terminal apparatus. For instance, in the method described in Patent Literature 1, when an orientation of a face is recognized using a digital camera included in a mobile terminal apparatus, there are problems, such as a deterioration in detection accuracy under a dark environment, an occurrence of a holding state in which the face goes out of a field of the camera. However, according to the mobile terminal apparatus in accordance with the first exemplary embodiment of the present disclosure, under the above circumstances, it is possible to stably determine the holding state. Hence, an effect is brought about that it is possible to rotate an orientation displayed on the display screen in accordance with the user's holding state under any circumstances.

It is noted that four holding patterns (holding patterns A to D) orthogonal or parallel to each other are exemplified in the first exemplary embodiment. However, this invention is not limited to the above constitution. In some mobile terminal apparatuses, holding states are limited to only two holding patterns having holding orientations orthogonal to each other. In this case, the number of holding states and the number of holding patterns may be two.

Besides, this invention can be applied to the situation in which a plurality of holding orientations (directions) have an arbitrary angle to each other, not limited to holding directions orthogonal or parallel to each other.

Besides, in the mobile terminal apparatus 1, a constitution, in which the operation unit and the display unit are arranged in a single housing, is exemplified as illustrated in FIG. 1. However, also in a mobile terminal apparatus (for example, foldable type) having a plurality of housings separately arranged, this invention can be applied by adopting a constitution in which a touch pad sensor is arranged on a back surface of the housing contact with a user.

Besides, a result of the holding pattern determining unit 202 can be used as a trigger for other functions other than a control of an orientation displayed on the display screen. For instance, applications launched for respective holding patterns may be registered in advance, and the registered application may be launched based on the determination by the holding, pattern determining unit 202. As a concrete example, it is registered so that when the holding patterns B or D (holding direction in which the display screen becomes a laterally long when viewed from a user) is determined, a reception of one segment broadcast and displaying its images are started. By the above registration, when the user holds the mobile terminal apparatus in the holding state B or D, the user can view a one segment broadcast program. This time, an orientation of the display image can be set according to the user's holding state.

It is noted that programs of the holding pattern registering unit 201, the holding pattern determining unit 202 in FIG. 3, and display switching unit 203 in FIG. 3 may be stored in a magnetic disk, a semiconductor memory, or other storage mediums. In this case, each of the programs is read out from the above-mentioned storage medium to the program area of the storage unit 102, and processed by a CPU (not shown) of the control unit 101.

Second Exemplary Embodiment

Figure 12:
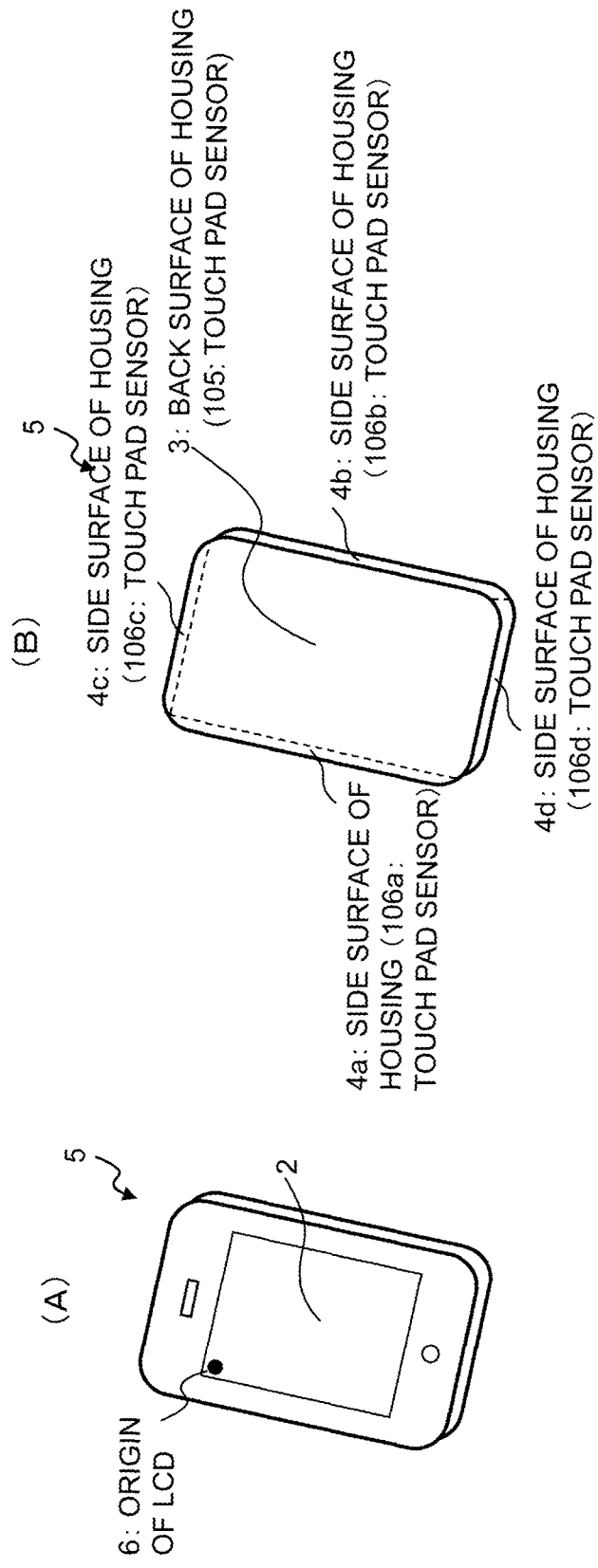
FIG. 12 is a perspective diagram illustrating a mobile terminal apparatus in accordance with a second exemplary embodiment of the present disclosure.

Next, a mobile terminal apparatus 5 in accordance with a second exemplary embodiment of the present disclosure will be described. FIG. 12A is a perspective diagram when viewing a display screen 2 of the mobile terminal apparatus 5, whereas FIG. 12B is a perspective diagram when viewing a back surface of a housing 3 opposite to the display screen 2. A difference of the mobile terminal apparatus 5 in the second exemplary embodiment from the mobile terminal apparatus 1 in the first exemplary embodiment resides in that as illustrated in FIG. 12B, touch pad sensors (106a to 106d) are arranged also on side surfaces of the housing (4a to 4d), respectively.

Figure 13:
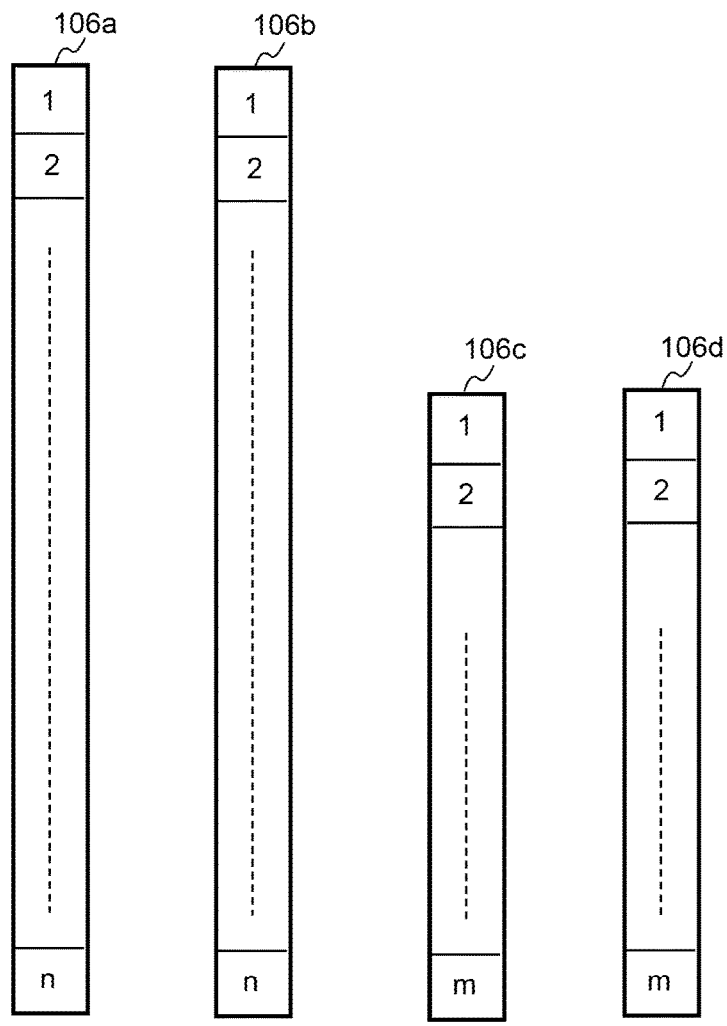
FIG. 13 is a diagram illustrating a touch pad sensor in the mobile terminal apparatus in accordance with the second exemplary embodiment of the present disclosure.

FIG. 13 illustrates arrangements of respective cells of the touch pad sensors (106a to 106d) arranged on the side surfaces of the housing (4a to 4d). Namely, in the second exemplary embodiment, in addition to cells of the touch pad sensor 105 on the back surface of the housing in FIG. 4, cells of the touch pad sensors (106a to 106d) arranged on the side surfaces of the housing (4a to 4d) in FIG. 13 are added. A similar processing to that in the first exemplary embodiment is performed based on touch pad sensor detection data detected by the entire cells mentioned above.

When a user holds the mobile terminal apparatus 5, the user often holds the mobile terminal apparatus 5 also contacting with the side surfaces of the housing (4a to 4d) as well. Thus, by arranging the touch pad sensors on the side surfaces of the housing (4a to 4d) as well as the back surface of the housing 3, it is possible to improve the accuracy of determination in the holding pattern determining unit 202.

The touch pad sensors (106a to 106d) on the side surfaces of the housing may be separated for each of the sides, or may be unified on an entire circumference. Alternatively, cells of the entire touch pad sensors may be arranged extending from the back surface of housing to the side surfaces of housing, which constitutes an entire integrated structure.

As described above, according to the mobile terminal apparatus in accordance with the second exemplary embodiment, by arranging touch pad sensors also on the side surfaces of housing, an effect is brought about that determination accuracy in holding pattern determining unit 202 can be improved in comparison to the first exemplary embodiment.

INDUSTRIAL APPLICABILITY

This invention can be applied to all mobile terminal apparatuses having a display function such as a mobile phone, a portable game machine, a portable television, and an electronic dictionary.

The exemplary embodiments and examples may include variations and modifications without departing the gist and scope of the present invention as disclosed herein and claimed as appended herewith, and furthermore based on the fundamental technical spirit. It should be noted that any combination and/or selection of the disclosed elements may fall within the claims of the present invention. That is, it should be noted that the present invention of course includes various variations and modifications that could be made by those skilled in the art according to the overall disclosures including claims and technical spirit. Particularly, any numerical range disclosed herein should be interpreted that any intermediate values or subranges falling within the disclosed range are also concretely disclosed even without specific recital thereof.

REFERENCE SIGNS LIST 1, 5 mobile terminal apparatus
2 display screen
3 back surface of housing
4a-4d side surface of housing
6 origin of LCD (origin of display screen)
101 control unit
102 storage unit
103 operation unit
104 display unit
105, 106a-106d touch pad sensor
107 program area
108 data area
201 holding pattern registering unit
202 holding pattern determining unit
203 display switching unit
401 display pattern A
402 display pattern B
403 display pattern C
404 display pattern D
601 registered pattern A (predetermined holding pattern A)
602 registered pattern B (predetermined holding pattern B)
603 registered pattern C (predetermined holding pattern C)
604 registered pattern D (predetermined holding pattern D)
801 touch pad sensor detection data
902 matching determination data A
903 matching determination data B
904 matching determination data C
905 matching determination data D
S1 display switching control signal

The invention claimed is:

1. A mobile terminal apparatus, comprising:
a touch pad sensor that is arranged on a back surface of a housing, and detects a contact position when held by a user; and
a processor that determines a holding pattern having a highest similarity to touch pad sensor detection data detected by the touch pad sensor among a plurality of predetermined holding patterns to output the determined holding pattern, wherein the processor calculates a sum of contact cells among the touch pad sensor detection data and wherein, prior to determining the holding pattern, the processor determines whether the sum of contact cells is greater than a predetermined threshold or not and wherein, when the sum of contact cells is greater than the predetermined threshold value, the processor determines the holding pattern; and
an orientation of information displayed on a display screen of a display is controlled based on the holding pattern outputted by the processor,
wherein the determination of the holding pattern and the determination whether the sum of contact cells is greater than the predetermined threshold value are both performed in series when held by a user, and
a registered application is launched based on the holding pattern outputted by the processor.

2. The mobile terminal apparatus according to claim 1, wherein the processor acquires outputs of the touch pad sensor when held in a plurality of predetermined holding states, and registers the outputs as the plurality of predetermined holding patterns, respectively.

3. The mobile terminal apparatus according to claim 2, wherein
the processor calculates the number of elements matching between the touch pad sensor detection data and each of the plurality of predetermined holding patterns, and determines that a predetermined holding pattern whose number of elements matching is maximum among the plurality of predetermined holding patterns has the highest similarity.

4. The mobile terminal apparatus according to claim 2, wherein
the touch pad sensor is arranged also on a side surface of the housing,
the processor outputs a holding pattern having a highest similarity among the plurality of predetermined holding patterns based on touch pad sensor detection data detected by the touch pad sensor arranged on the back surface and the side surface of the housing.

5. The mobile terminal apparatus according to claim 1, wherein
the processor calculates the number of elements matching between the touch pad sensor detection data and each of the plurality of predetermined holding patterns, and determines that a predetermined holding pattern whose number of elements matching is maximum among the plurality of predetermined holding patterns has the highest similarity.

6. The mobile terminal apparatus according to claim 5, wherein
the touch pad sensor is arranged also on a side surface of the housing,
the processor outputs a holding pattern having a highest similarity among the plurality of predetermined holding patterns based on touch pad sensor detection data detected by the touch pad sensor arranged on the back surface and the side surface of the housing.

7. The mobile terminal apparatus according to claim 1, wherein
the touch pad sensor is arranged on a side surface of the housing,
the processor outputs a holding pattern having a highest similarity among the plurality of predetermined holding patterns based on touch pad sensor detection data detected by the touch pad sensor arranged on the back surface and the side surface of the housing.

8. The mobile terminal apparatus according to claim 1, wherein
the plurality of predetermined holding patterns include at least two holding patterns orthogonal to each other.

9. The mobile terminal apparatus according to claim 1, wherein
the plurality of predetermined holding patterns include at least four holding patterns orthogonal or parallel to each other.

10. A display method for a mobile terminal apparatus that controls an orientation of information displayed on a display screen thereof, the display method comprising:
- acquiring touch pad sensor detection data when a user holds the mobile terminal apparatus by a touch pad sensor arranged in the mobile terminal apparatus;
- calculating a sum of contact cells among the touch pad sensor detection data;
- determining whether the sum of contact cells is greater than a predetermined threshold or not;
- when the sum is greater than the predetermined threshold, determining a holding pattern having a highest similarity to the touch pad sensor detection data among a plurality of predetermined holding patterns and outputting the determined holding pattern;
- switching an orientation of information displayed on a display screen of the mobile terminal apparatus based on the determined holding pattern outputted,
- wherein the determination of the holding pattern and the determination whether the sum of contact cells is greater than the predetermined threshold value are both performed in series when held by a user, and
- a registered application is launched based on the holding pattern outputted by the mobile terminal apparatus.

11. The display method for a mobile terminal apparatus according to claim 10, further comprising:
- acquiring outputs of the touch pad sensor when held in a plurality of predetermined holding states, and registering in advance the outputs as the plurality of predetermined holding patterns, respectively.

* * * * *